Figure 1:
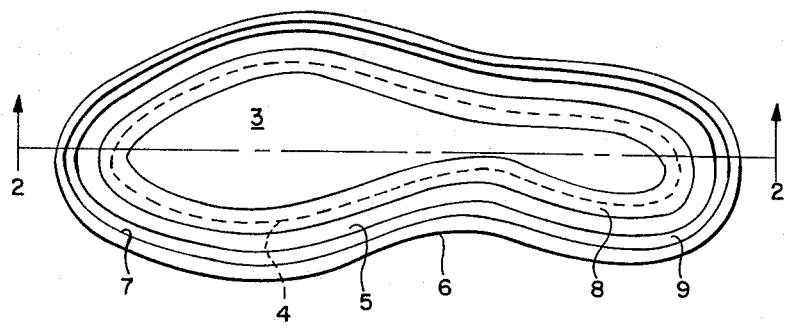

June 6, 1967 S. PORTER ET AL 3,324,219
METHOD OF APPLYING PLASTIC SOLES TO LASTED UPPERS
Filed April 25, 1963

INVENTORS
SYDNEY PORTER &
EDWARD H. GODDARD
BY
Christel & Bean
ATTORNEYS

United States Patent Office 3,324,219
Patented June 6, 1967

3,324,219
METHOD OF APPLYING PLASTIC SOLES TO
LASTED UPPERS
Sydney Porter and Edward H. Goddard, Middleport, N.Y.,
assignors to Royalton Industries, Inc., Gasport, N.Y.
Filed Apr. 25, 1963, Ser. No. 275,665
3 Claims. (Cl. 264—244)

This invention relates to a new and useful method of applying plastic soles to lasted uppers.

Plastic materials are being increasingly utilized in the manufacture of footwear. In some instances, the entire article is made of plastic material, while in others a plastic sole is applied to a fabric or other non-plastic upper. This invention is particularly concerned with the latter, although its utility is not limited thereto.

This invention contemplates the casting of plastic soles on to lasted uppers. In carrying out this process, the upper is inverted, and a mold is placed thereon around the outer periphery of the lasted upper bottom. The mold is filled with plastic material, and a sole plate can be applied to provide the desired sole shape. The plastic mass then is fused to the lasted upper.

However, while this casting method is more advantageous than other methods, in many respects, it poses a problem because the plastic material tends to leak out of the mold and onto the upper. This occurs because when the upper is lasted, whether by hand or by machine, it is impossible, as a practical matter, to maintain a fluid tight juncture between the inner sole and the edge of the lasted upper, and between the lasted upper and the containing mold.

Consequently, when filling the mold the liquid plastic material often escapes through either or both of these junctures, disfiguring the upper either externally or internally, or both.

Accordingly, the primary object of this invention is to provide a method of applying plastic soles to lasted uppers, in which these junctures are effectively sealed against the escape of fluid plastic sole material.

Another object of this invention is to accomplish the foregoing in a method which is easily carried out and which is relatively inexpensive.

In one aspect thereof, the method of applying plastic soles to lasted uppers in accordance with this invention is characterized by the steps of placing a sole containing mold against the lasted upper, sealing the juncture therebetween with a plastic material fusible with the plastic sole material, thereafter filling the mold with plastic sole material, and then fusing the sole material to the sealing material and to the lasted upper.

In another aspect thereof, the method of this invention is characterized by the steps of placing a containing mold about the upper periphery of an inverted lasted upper, sealing the junctures between the mold and the upper and between the inner sole and the edge of the lasted upper with a plastic material of a viscosity sufficient to preclude passage of the material through the junctures under its own weight, causing the sealing material to set without fusing, filling the mold with plastic sole material, and thereafter fusing the sole material to the sealing material and to the lasted upper.

Figure 2:
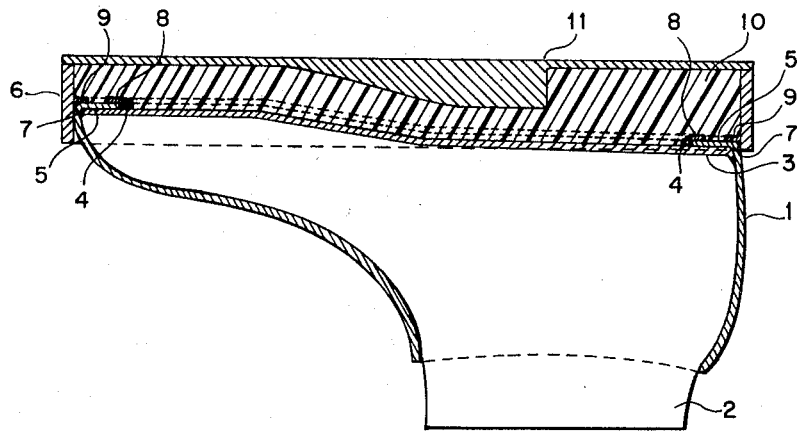

The foregoing and other objects, advantages and characterizing features will become clearly apparent from the ensuing detailed description of one, illustrative, presently preferred embodiment thereof, considered in conjunction with the accompanying drawing illustrating the same wherein like reference numerals denote like parts throughout the various views and wherein:

FIG. 1 is a top plan view of an inverted lasted upper with a sole containing mold thereon, subsequent to application of the juncture sealing layers but prior to filling of the mold with the sole material; and FIG. 2 is a vertical sectional view thereof, with the sole plate in place and after filling the mold with the plastic material.

Referring now to the accompanying drawing, there is shown an upper 1 which has been drawn and shaped over a last 2 of conventional form. Upper 1 can be of fabric, or any desired material, and is lasted in the usual manner over an inner sole 3. This produces a juncture 4 between inner sole 3 and the upper edge portion 5. It will be understood by those skilled in the art that the upper is drawn across inner sole 3 by string or cord, which then is laced, in the usual manner, but the lacing has been omitted from the drawing for greater clarity.

The lasted upper is inverted, as shown, and a sole containing mold 6 is applied thereagainst, around edge portion 5. This produces a juncture 7 between mold 6 and the lasted upper 1.

Theoretically, edge portion 5 can be drawn very snugly across inner sole 3, and mold 6 can be tightly fitted to upper 1, in a manner such as to preclude the escape of a fluent plastic material through junctures 4 and 7. However, in practice this is not the case, largely because of the manual operations involved in lasting the uppers. The variations resulting from hand or machine lasting of the uppers introduces tolerances making it impossible to consistently achieve a sufficiently liquid tight fit between the upper and the mold, and between the inner and outer soles. As a result, when the mold is filled with liquid plastic material for the sole, the fluent material can and often does escape through juncture 4, between the edge portion 5 and inner sole 3, or through juncture 7 between mold 6 and upper 1, or both. In the first instance, the interior of the upper is disfigured by the plastic material. In the second instance, the exterior of the upper is spoiled. In either case, the footwear is unacceptable to the trade and must be rejected.

Accordingly, it is a particular feature of this invention that junctures 4 and 7 are sealed before filling the mold with liquid plastic. This is accomplished in accordance with the invention, by applying, across the junctures, layers of sealing material which is sufficiently viscous as to preclude its escape through the junctures under its own weight. In addition to its viscosity, the sealing material must be compatible with the plastic sole material, and fusible therewith and with the inner sole and the lasted upper.

It is contemplated that the sole proper can be made of a polyvinyl chloride, with or without nitrile rubbers, or of a rubber latex or a urethane, although other plastic materials may prove to be suitable. Suitable sealing materials can be selected from these and, in addition to having a higher viscosity, must be compatible with the upper and inner and outer sole materials, and must be capable of forming good adhesion therewith.

Whereas the plastic sole material is relatively fluent prior to fusing, the sealing material is selected to have a higher viscosity, such that it will not flow through junctures 4 and 7 under its own weight.

Presently preferred formulations for the sole and sealing materials are as follows:

| | Sole Material | Seal Material |
|---|---|---|
| Polyvinyl chloride resin | 100 parts | 100 parts. |
| Di-ethyl hexyl phthlate plasticizer | 52 parts | 35 parts. |
| Di-octyl phthlate plasticizer | 10 parts | 7 parts. |
| G.P.E. epoxy ester (Union Carbide Corp.) | 5 parts | 3 parts. |
| 6V6A Barium-Cadmium-Zinc complex stabilizer (Harshaw Chemicals) | 4 parts | 3 parts. |
| Color | As needed | As needed. |

Thus, it is seen that the sealing material has a significantly lower proportion of plasticizer to resin, and therefore a greater viscosity, than the sole material.

In accordance with this invention, after lasting the upper and applying mold 6 thereto, the next step is to apply, along and across the juncture 4, a strip or layer 8 of the sealing material. A similar strip or layer 9 of sealing material is applied along and across juncture 7.

The material comprising the sealing layers 8 and 9 can be simply flowed along the junctures, in the manner of a caulking gun, for example. The sealing material is applied across the junctures, completely therearound to comprise closed rings. Once the relatively viscous sealing material has been applied to the junctures, to provide the layers 8 and 9, the sealing material is set, as by subjecting it to heat. Thus, infrared lights can be brought into position over the mold, or the assembled mold and last can be passed beneath infrared lights, or subjected to heat from any other source, until the material of the sealing layers 8 and 9 has set. However, it is a further feature of my invention that the sealing material is merely set at this point, and is not yet fused. This is important, because the fusing process is irreversible, and the sealing material must subsequently be fused to the sole material.

Then, the mold is filled with the mass 10 of plastic sole material, either through sole plate 11 or prior to application of the sole plate. This is done without added pressure, the containing mold simply being filled with the material. At this point, it will be realized that, whereas material 10, which usually is relatively fluent and runny, could otherwise run between the inner sole and the edge of the lasted upper through juncture 4, or between the mold and upper through juncture 7, it now is prevented from such escape by the sealing bands 8 and 9. Having set, the sealing layers effectively block passage of the sole material through the junctures, even under pressure of sole plate 11, whereby the sole material is contained within the mold, and within the exposed area of the lasted upper.

When the mold has been filled, the sole and sealing materials are fused, as by subjecting them to infrared heat, or to electrical fusing. In the fusing process, the sole and sealing materials are fused to the inner sole and the edge of the lasted upper, and to each other. In the process, the sole material 10 and sealing layers 8 and 9 become as one, to provide a sole which is completely bonded to itself and to the lasted upper. Since the sealing material is compatible and fusible with the sole material, it does not in any way interfere with proper forming and adhesion of the sole. It does, however, effectively prevent the undesired escape of the sole material and consequent disfigurement of the upper.

Accordingly, it is seen that our invention fully accomplishes its intended objects, and while we have disclosed and described in detail only one embodiment thereof, it is to be understood that this has been done by way of illustration, and not as a limitation. Such variations and modifications as will naturally occur to those skilled in the art are intended to be included within the scope of the appended claims.

Having fully disclosed and completely described our invention, and its mode of operation, what we claim as new is:

1. The method of applying plastic soles to lasted uppers which comprises, placing a sole mold against the lasted upper, sealing the juncture therebetween with a layer of material fusible with the plastic sole material, causing the sealing material to be set without fusing, filling the mold with plastic sole material, and fusing the sole and sealing materials to each other and to the lasted upper.

2. The method of applying plastic soles to lasted uppers which comprises, placing a containing mold about an inverted lasted upper, sealing the junctures between the mold and the upper and between an inner sole and the edge of the lasted upper with a plastic material compatible with the sole material and of sufficient viscosity as not to pass through said juncture under its own weight, causing the sealing material to set without fusing, filling the mold with plastic sole material, and fusing the sole material to the sealing layer and to the lasted upper.

3. The method of applying plastic soles to lasted uppers which comprises, placing a sole mold against the lasted upper, sealing the juncture between the inner sole and the edge of the lasted upper with a layer of material fusible with the plastic sole material, causing the sealing material to be set without fusing, filling the mold with plastic material, and fusing the sole and sealing materials to each other and to the lasted upper.

References Cited

UNITED STATES PATENTS

| 2,937,405 | 5/1960 | Berggren et al. | 18—175 X |
| 3,035,309 | 5/1962 | Bingham. | |
| 3,090,772 | 5/1963 | Crowell | 264—244 X |

ROBERT F. WHITE, *Primary Examiner.*

L. S. SQUIRES, T. J. CARVIS, *Assistant Examiners.*